March 25, 1969
E. L. KERN
3,434,776
LASER COMMUNICATION SYSTEM USING FLEXIBLE
SILICONE TRANSMISSION LINE
Filed July 29, 1965
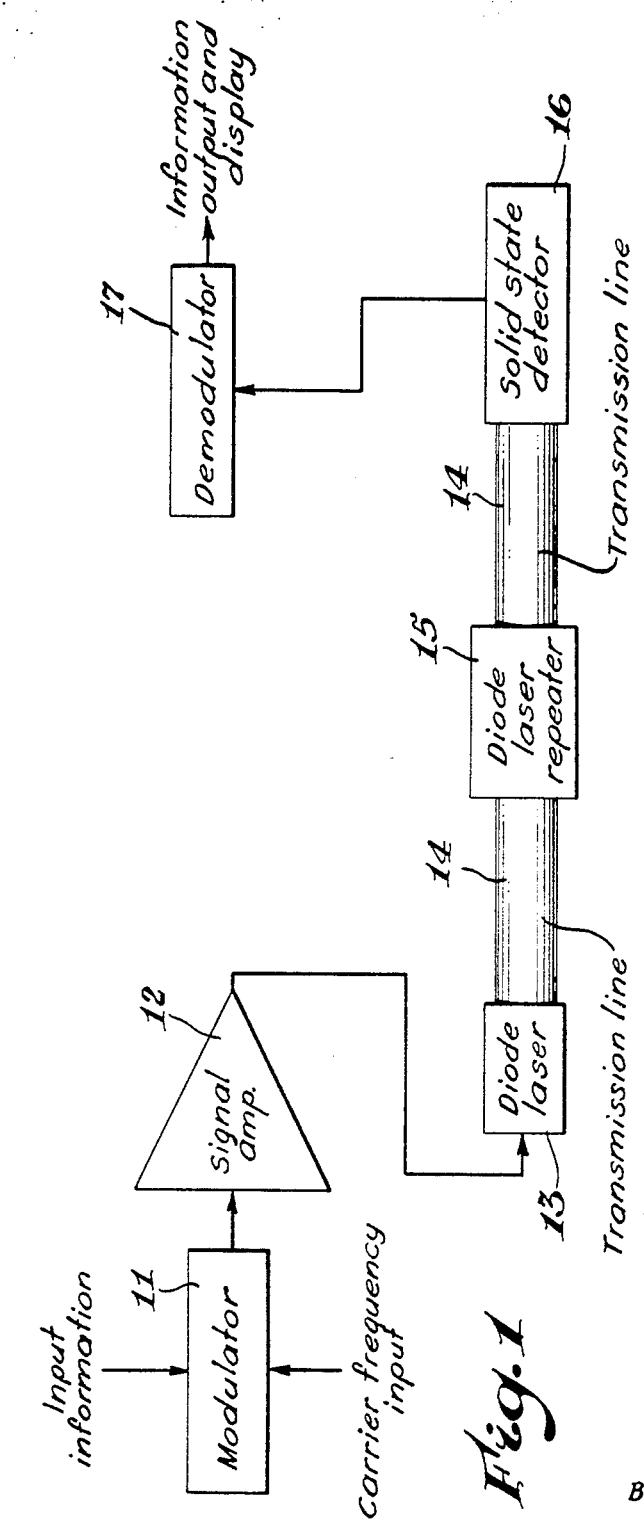
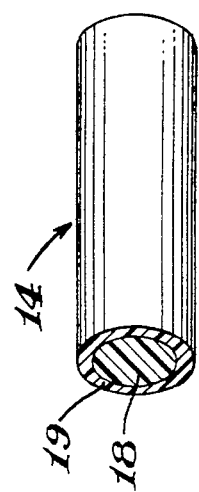
INVENTOR.
Edward L. Kern
BY
ATTORNEY

United States Patent Office 3,434,776
Patented Mar. 25, 1969

3,434,776
LASER COMMUNICATION SYSTEM USING FLEXIBLE SILICONE TRANSMISSION LINE
Edward L. Kern, Midland, Mich., assignor to Dow Corning Corporation, Midland, Mich., a corporation of Michigan
Filed July 29, 1965, Ser. No. 475,724
Int. Cl. G02b 5/14; H01s 3/00
U.S. Cl. 350—96     2 Claims

ABSTRACT OF THE DISCLOSURE

There is described herein a laser beam transmission system in which there is used a transmission line consisting of a flexible polymeric silicone material. The transmission line may have a coating thereon of material having a refractive index lower than that of the silicone material, in order to limit losses.

---

The present invention relates to laser communication systems, and more particularly to improvements in transmission lines for laser communication systems.

The idea of signalling with light is an ancient one and many variations of systems of communication utilizing light have been developed. Until the development of the laser, however, the use of light in signalling was limited by the weakness and noisiness of available light sources. The laser produces an almost ideally smooth wave carrying substantially nothing but that which is put on it. Immediately, the idea of modulating the laser with information became apparent to communication engineers working within the confines of an already crowded frequency spectrum. The idea of being able to transmit a 100,000 megacycle signal on a single carrier was very appealing. Various modulating methods were suggested and tunable lasers were developed. In tests of communication systems, information could indeed be transmitted for relatively large distances on a laser beam, if there were no rain, fog, snow, or large amounts of dust to scatter or block the laser beams.

The idea of light pipes for carrying the beam also suggested itself to some who were skilled in the art. If the modulated beam could be transmitted through a closed pipe the weather would not have an effect on transmission efficiency. The problem, however, has been to find a suitable light pipe for use as a laser transmission line. Hollow pipes were subject to collapse or overly expensive, while solid pipes were, in general, subject to breakage or had too great an attenuation to be practical. This problem has been persistent up to the present time.

The present invention has for its primary object the provision of an improved transmission line for use in a laser communication system.

A further object is the provision of a laser communication system transmission line capable of high efficiency transmission of a laser beam, but which is not subject to breakage, collapse or corrosion in use.

Another object of the present invention is to provide a laser transmission line which is flexible for ease in installation and for turning corners.

In accordance with these and other objects, there is provided by the present invention a transmission system using a transmission line of flexible, transparent silicone polymeric material which may be suitably clad to protect the line from abrasion and to aid in preventing light losses along the line. It has been found that very small diameter lines made of these materials may be utilized in a communication system and that due to their flexible nature, a large number of these lines may be carried within a single cable, much as wires are presently utilized in electrical systems. It will be realized also that electrical shielding and insulation is unnecessary thereby increasing the physical number of lines carried in a cable. Due to the wide frequency band over which a single laser carrier may be modulated, the signal carrying capacity of a laser beam carrying cable of any given size according to this invention is many times that of a current carrying cable of equal size.

Other objects and attendant advantages of the invention will become obvious to those skilled in the art by a consideration of the following detailed description when read in conjunction with the accompanying drawings wherein:

FIG. 1 is a schematic block diagram of a laser transmission system made in accordance with the present invention; and FIG. 2 is a view in perspective of a length of transmission line made in accordance with the present invention.

Referring now to the drawings wherein like reference numerals designate like or corresponding parts throughout the views, there is shown in FIG. 1 a schematic diagram of a communication system made in accordance with this invention. The specific components shown, aside from the transmission line, may be of conventional type design and are not described herein in detail.

In the system shown, an electronic modulator 11 modulates a carrier frequency in accordance with an information input. The modulated signal is amplified in a signal amplifier 12 and fed into an injection diode-type laser 13 which acts as a source of coherent light. At present, the diode type laser is preferable over other solid state or gaseous lasers due to its higher optical efficency and the lower current supply required for pumping the diode. The frequency of the light produced by the laser may be varier or tuned by varying the temperature of the laser as is known in the art. For example, pure gallium arsenide at about room temperature produces a laser beam of 9,000 Angstroms wavelength, but by cooling of the laser the wavelength may be reduced to 8,400 Angstroms. Similarly, galluim arsenide phosphide lasers may be made to operate in a band between about 6,100 Angstroms and 8,400 Angstroms. As an alternative to electronic modulation of the carrier, the unmodulated carrier may be fed directly to the laser and an optical modulator may be provided at the output of the laser 13. The optical modulator may be of the types using electro-optical crystals, magneto-optical crystals, Kerr cell or any other suitable phase or intensity modulator. Electro-optical crystals such as the phosphate (ammonium dihydrogen or potassium dihydrogen) and potassium dihydrogen arsenates at present appear to have an advantage over other types in that they require more modest information signals.

The laser beam produced by the laser 13 is fed through a transmission line 14, which will be described in detail hereinafter with reference to FIG. 2 and which may include one or more repeaters or amplifiers 15, to a detector 16 and demodulator 17 which retrieves the input information and may present it on suitable display means.

As shown in FIG. 2, the transmission line 14 in accordance with the present invention consists of a transparent silicone polymeric material 18 which may be covered with cladding 19 to protect the transparent material from abrasion. The silicone polymeric material used for the transmission line may be of any transparent type which is elastomeric, liquid, or rigid in nature, but which is easily shaped and is not brittle. If liquid materials are used a cladding jacket is a necessity to confine the liquid. Light transmissibility characteristics of these materials indicate that while there is severe attenuation at most frequencies, transmission windows where there is extremely low attenuation appear at particular frequencies. By tuning the lasers in the system to match the frequency of the transmission window in the silicone material of the transmission line, or selecting lasers which produce outputs at these frequencies, the laser beam may be carried with extremely low attenuation. For example, a light pipe of optical grade Dow Corning "Sylgard" 182 potting resin was found to have transmission windows at 7600 A. and at 8270 A., both within the range of gallium arsenide-phosphite diode laser emission. This polysiloxane resin in cured form is transparent, has a minimum Shore A scale hardness of 35 durometer points, and has a brittle point below minus 70° C. Its mechanical tensile strength is around 900 p.s.i. and the optical grade of this material has a refractive index of about 1.43. The surface of the light pipe may be polished to provide better internal reflection and a cladding may be applied to the surface to further enhance internal reflection and/or prevent abrasion.

If cladding on the surface of the transmission line is desired, the cladding substance must be one which may be readily adhered to the material of the transmission line and is preferably of a lower refractive index than the transmission line material. The use of material having a lower refractive index provides greater internal reflection along the transmission line, thereby providing lower attenuation along the line. The cladding coating needs only to be of a thickness which is several times the wavelength of the light being transmitted, but may be thicker for minimizing the danger of abrasion of the transmission line itself. Thicknesses of between 100 and 10,000 A. have been found practical. A filled polysiloxane rubber is suitable as a cladding material, although various other materials may also be used. In a particular embodiment of the invention an extrusion of Dow Corning LS–63 "Silastic" silicone rubber having a refractive index of 1.399 was found to be suitable.

Variations and modifications of the invention embodiment described herein will become obvious to those skilled in the art from a consideration of the foregoing description.

It is therefore to be understood that the invention may be practiced otherwise than as specifically described.

That which is claimed is:

1. In a laser beam transmission system the improvement which comprises a light pipe transmission line consisting of a transparent flexible polymeric silicone material.

2. In a laser beam transmission system the improvement which comprises a light pipe transmission line consisting of a transparent flexible polymeric silicone material having a coating thereon of material having a refractive index lower than that of said silicone material.

References Cited

UNITED STATES PATENTS

| | | | |
|---|---|---|---|
| 3,030,852 | 4/1962 | Courtney-Pratt | 350—96 |
| 3,207,034 | 9/1965 | Harter | 350—96 X |
| 3,222,615 | 12/1965 | Holly | 350—96 X |
| 3,228,741 | 1/1966 | Becker | 351—160 |

JOHN K. CORBIN, *Primary Examiner.*

U.S. Cl. X.R.

331—94.5